United States Patent
Wagner

[11] Patent Number: 6,057,797
[45] Date of Patent: May 2, 2000

[54] RADAR SENSOR FOR USE IN MOTOR VEHICLES

[75] Inventor: Klaus-Peter Wagner, Stuttgart, Germany

[73] Assignee: Robert Bosch GmbH, Stuttgart, Germany

[21] Appl. No.: 09/194,956

[22] PCT Filed: Jan. 9, 1997

[86] PCT No.: PCT/DE97/00018

§ 371 Date: Dec. 7, 1998

§ 102(e) Date: Dec. 7, 1998

[87] PCT Pub. No.: WO97/47988

PCT Pub. Date: Dec. 18, 1997

[30] Foreign Application Priority Data

Jun. 11, 1996 [DE] Germany ............................ 196 23 196

[51] Int. Cl.[7] ............................. G01S 7/521; G01S 13/93; H01Q 1/27
[52] U.S. Cl. ................................. 342/70; 342/27; 342/71; 343/711
[58] Field of Search ................................. 342/59, 70, 71, 342/72, 27, 28; 343/711, 712, 713, 872, 873, 893

[56] References Cited

U.S. PATENT DOCUMENTS

| | | | |
|---|---|---|---|
| 3,772,690 | 11/1973 | Nations | 342/72 |
| 3,778,823 | 12/1973 | Sato et al. | 342/72 |
| 3,848,914 | 11/1974 | Wathen | 342/72 X |
| 3,935,559 | 1/1976 | Straffon et al. | 342/71 X |
| 5,670,962 | 9/1997 | Henderson et al. | 342/70 |
| 5,696,515 | 12/1997 | Zyren et al. | 342/70 X |

FOREIGN PATENT DOCUMENTS

| | | |
|---|---|---|
| 0 517 977 | 12/1992 | European Pat. Off. . |
| 0 568 427 | 11/1993 | European Pat. Off. . |
| 44 12 770 | 10/1995 | Germany . |

OTHER PUBLICATIONS

Merrill I. Skolnik, "Introduction to Radar System," (McGraw–Hill, New York, 1980, second edition), p. 254, 1980.

*Primary Examiner*—Bernarr E. Gregory
*Attorney, Agent, or Firm*—Kenyon & Kenyon

[57] ABSTRACT

In order to make the connecting lines from at least one transmitting antenna element and at least one receiving antenna element to a common oscillator as short as possible, the receiving antenna element is arranged outside the radiation pattern of the transmitting antenna element, the transmitting and receiving antenna elements being oriented in different directions. An arrangement deflects the reflected radar beams onto the receiving antenna element and/or deflect the radar beams emitted by the transmitting antenna element in a desired direction.

10 Claims, 1 Drawing Sheet

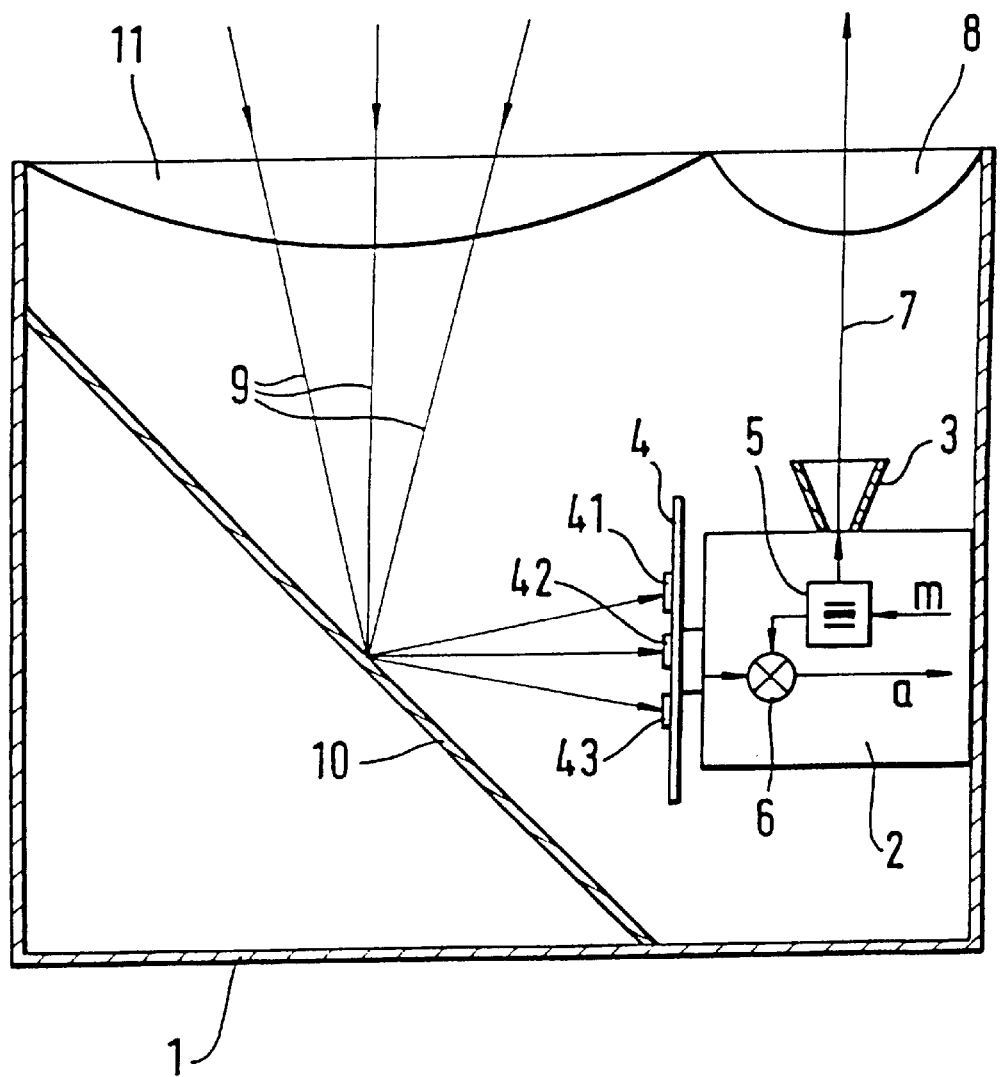

RADAR SENSOR FOR USE IN MOTOR VEHICLES

FIELD OF THE INVENTION

The present invention relates to a radar sensor for use in motor vehicles, which has at least one antenna element for emitting radar beams and, physically separated therefrom, at least one antenna element for receiving the radar beams reflected by one or more objects.

BACKGROUND INFORMATION

Radar sensors can be used in motor vehicles preferably for measuring distances and relative velocities of vehicles traveling one behind the other. Such a proximity radar system is usually referred to in the literature as an Autonomous/Intelligent Cruise Control (AICC/ICC) or Adaptive Cruise Control (ACC). The system generates either a collision warning signal or automatically controls the brakes or the drive of the motor vehicle if the distance to a vehicle traveling ahead drops below a minimum permissible value.

European Patent No. 0 568 427 describes a radar sensor, in which a plurality of transmitting antenna elements and a plurality of receiving antenna elements are arranged separately from one another. The transmitting antenna elements generate a multibeam radiation pattern, and an array of receiving antenna elements installed in front of the transmitting antenna elements receives the radar beams (radar echos) reflected from one or more objects. The receiving elements are arranged in the transmission range of, and oriented in the same direction as, the transmitting antenna elements. If both the radar transmitter and the radar receiver are to be supplied from the same oscillator to minimize costs, relatively long high-frequency lines are needed in the case of the known antenna arrangement, since the outputs of the receiving antenna elements must be run via long, circuitous routes to a common oscillator arranged near the inputs of the transmitting antenna elements. Long lines, on the other hand, have the disadvantage that they generate relatively high losses.

An object of the present invention is to provide a radar sensor which requires the shortest possible lines in order both to supply the transmitting antenna element with the carrier signal of an oscillator and to demodulate the output signals of the receiving antenna element with the same oscillator carrier signal.

SUMMARY OF THE INVENTION

According to the present invention, this object is achieved by arranging at least one receiving antenna element is arranged outside the radiation pattern of at least one transmitting antenna element. The transmitting and receiving antenna elements are oriented in different directions. An arrangement is provided to deflect the reflected radar beams onto the receiving antenna element and/or the radar beams emitted by the transmitting antenna element in a desired direction. With this arrangement of the transmitting and receiving antenna elements only very short connecting lines to a common oscillator are needed. Due to the separation of the transmitting and receiving antenna elements, the use of loss-producing components (e.g. circulators, ring hybrids), which separate transmitted signals from received signals in the case of radar sensors having antennas with both transmitting and receiving functions, can be omitted.

It is also advantageous to orient the receiving antenna elements orthogonally to the transmitting antenna elements and to provide a deflecting mirror to deflect the reflected radar beams onto the at least one receiving antenna element. To receive the reflected radar beams (radar echo), the use of at least three receiving antenna elements is advantageous. It is also recommended that one or more quasi-optical lenses be provided for focusing the transmitted and reflected radar beams. In another embodiment, two quasi-optical lenses can be arranged next to one another in a plane with the at least one transmitting antenna element being arranged in the focal plane of one of the two lenses and the deflecting mirror being oriented to the focal plane of the other quasi-optical lens so that the mirror deflects the reflected radar beams focused by this lens onto the at least one receiving antenna element.

BRIEF DESCRIPTION OF THE DRAWING

The FIGURE shows an exemplary embodiment of a radar sensor according to the present invention.

DETAILED DESCRIPTION

The arrangement illustrated in the drawing shows a radar sensor, such as can be used as an adaptive cruise control in a motor vehicle. The entire radar sensor is mounted in a compact housing 1. A microwave circuit 2, which is preferably a planar type transmitting and receiving circuit, is in this housing 1. Microwave circuit 2 is coupled to a transmitting antenna 3 and a receiving antenna 4. Microwave circuit 2 could also be mounted in its own housing, separate from the antennas.

In the embodiment illustrated in the FIGURE, a single transmitting antenna element 3, for example, in the form of a horn transmitter, is provided. Receiving antenna 4 has three planar antenna elements 41, 42, and 43 in the embodiment illustrated. As an alternative to the embodiment illustrated in the FIGURE, more antenna elements may also be provided on the transmitting side and more then or less than three antenna elements can be provided on the receiving side. In addition, the transmitting and/or receiving antenna elements can be designed as horns or planar antenna structures or as dielectric polyrod antennas.

The microwave circuit includes an oscillator 5, preferably a Gunn oscillator, and a mixer 6 for each of the receiving antenna elements 41, 42, 43 present (represented by only one mixer illustrated in the FIGURE), which mixes the output signal of the respective antenna element 41, 42, 43 with the carrier frequency of oscillator 5 into an intermediary frequency signal a. Microwave circuit 2 can also contain additional circuit elements for processing intermediary frequency signal a. No further circuit details shall be discussed here. Oscillator 5 is used not only for modulating the received reflected radar beams, but also as the source of the transmitted signals. An input channel m for oscillator 5 indicates that the carrier signal generated by oscillator 5 is modulatable.

The FIGURE shows that transmitting antenna element 3 is physically separated from receiving antenna elements 41, 42, 43; receiving antenna elements 41, 42, 43 are arranged outside the beam path of the transmitted radar beams laterally next to transmitting antenna element 3. By having transmitting antenna element 3 and receiving antenna elements 41, 42, 43 oriented in different directions, preferably orthogonally to each other, the connecting line from the output of receiving antenna element 41, 42, 43 to mixer 6 controlled by common oscillator 5 can be kept extremely short. Due to the short lines, the losses in microwave circuit 2 can be kept low.

According to the embodiment of the present invention shown in the FIGURE, transmitting antenna element 3 is oriented so that radar beams 7 are emitted directly without deflection. A quasi-optical lens 8, in whose focal point transmitting antenna element 3 is arranged, causes the transmitted radar beams 7 to be appropriately focused. Since receiving antenna elements 41, 42, 43 are not oriented in the direction of incidence of reflected radar beams 9, a deflecting mirror 10, responsible for radar echos 9 to be deflected onto receiving antenna elements 41, 42, 43 as completely as possible, is installed in housing 1. A second quasi-optical lens 11 focuses radar echos 9 onto deflecting mirror 10. With proper shaping (e.g. flat, convex, concave) of deflecting mirror 10, the deflection of the radar echo received by lens 11 onto receiving antenna elements 41, 42, 43 can be optimized. Deflection mirror 10 can be permanently installed in one corner of housing 1.

Receiving antennas 4 and transmitting antennas 3 can also have their locations switched. For any other arrangement of transmitting antennas 3 and receiving antennas 4 different from that shown, additional deflecting mirrors may be required.

What is claimed is:

1. A radar sensor utilized in a motor vehicle, comprising:
    a transmitting antenna element oriented in a first direction and emitting radar beams, at least a portion of the radar beams being reflected in a return direction by an object external to the motor vehicle;
    a deflecting surface oriented to redirect the reflected radar beams from the return direction to a second direction different from the first direction; and
    a receiving antenna element oriented in the second direction and receiving the redirected radar beams, the receiving antenna element being arranged at a predetermined distance from the transmitting antenna element outside a radiation pattern of the transmitting antenna element.

2. The radar sensor according to claim 1, wherein the second direction is orthogonal to the first direction, the transmitting antenna element being directly oriented in the desired direction of transmission, and wherein the deflecting surface deflects the reflected radar beams onto the receiving antenna element.

3. The radar sensor according to claim 1, further comprising a lens for focusing the emitted radar beams and the reflected radar beams.

4. The radar sensor according to claim 1, wherein the at least one receiving antenna element includes at least three receiving antenna elements for receiving the reflected radar beams.

5. The radar sensor according to claim 1, further comprising two lenses arranged next to each other in a single plane, wherein the transmitting antenna element is arranged in a first focal plane of a first lens of the two lenses, and wherein the deflecting surface includes a deflecting mirror, the deflecting mirror being oriented with respect to a second focal plane of a second lens of the two lenses to deflect the reflected radar beams and to focus the reflected radar beams onto the receiving antenna element.

6. A radar sensor utilized in a motor vehicle, comprising:
    a transmitting antenna element oriented in a transmission direction and emitting radar beams in the transmission direction;
    a deflecting surface oriented to redirect the emitted radar beams in a redirect direction different than the transmission direction so that, upon reflection of the radar beams off an object external to the motor vehicle, at least a portion of the reflected radar beams return to the motor vehicle in a return direction; and
    a first receiving antenna element oriented toward the return direction and receiving the reflected radar beams, wherein the return direction is different than the transmission direction, the first receiving antenna element being arranged at a predetermined distance from the transmitting antenna element outside a radiation pattern of the transmitting antenna element.

7. The radar sensor according to claim 6, wherein the redirect direction is orthogonal to the transmission direction and the first receiving antenna element extends in the transmission direction.

8. The radar sensor according to claim 6, further comprising a lens for focusing the emitted radar beams and the reflected radar beams.

9. The radar sensor according to claim 6, further comprising second and third receiving antenna elements oriented toward the return direction for receiving the reflected radar beams.

10. The radar sensor according to claim 6, further comprising:
    first and second lenses arranged adjacent to one another in a single plane, wherein the first receiving antenna element is arranged in a first focal plane of the first lens to focus the redirected radar beams onto the first receiving antenna element; and
    a deflecting mirror oriented with respect to a second focal plane of the second lens to focus the radar beams emitted by the transmitting antenna in the predetermined transmission direction.

* * * * *